March 12, 1957  E. F. DUFFY  2,784,857
HINGED DRAWBAR FOR TRAILERS
Filed Feb. 28, 1955
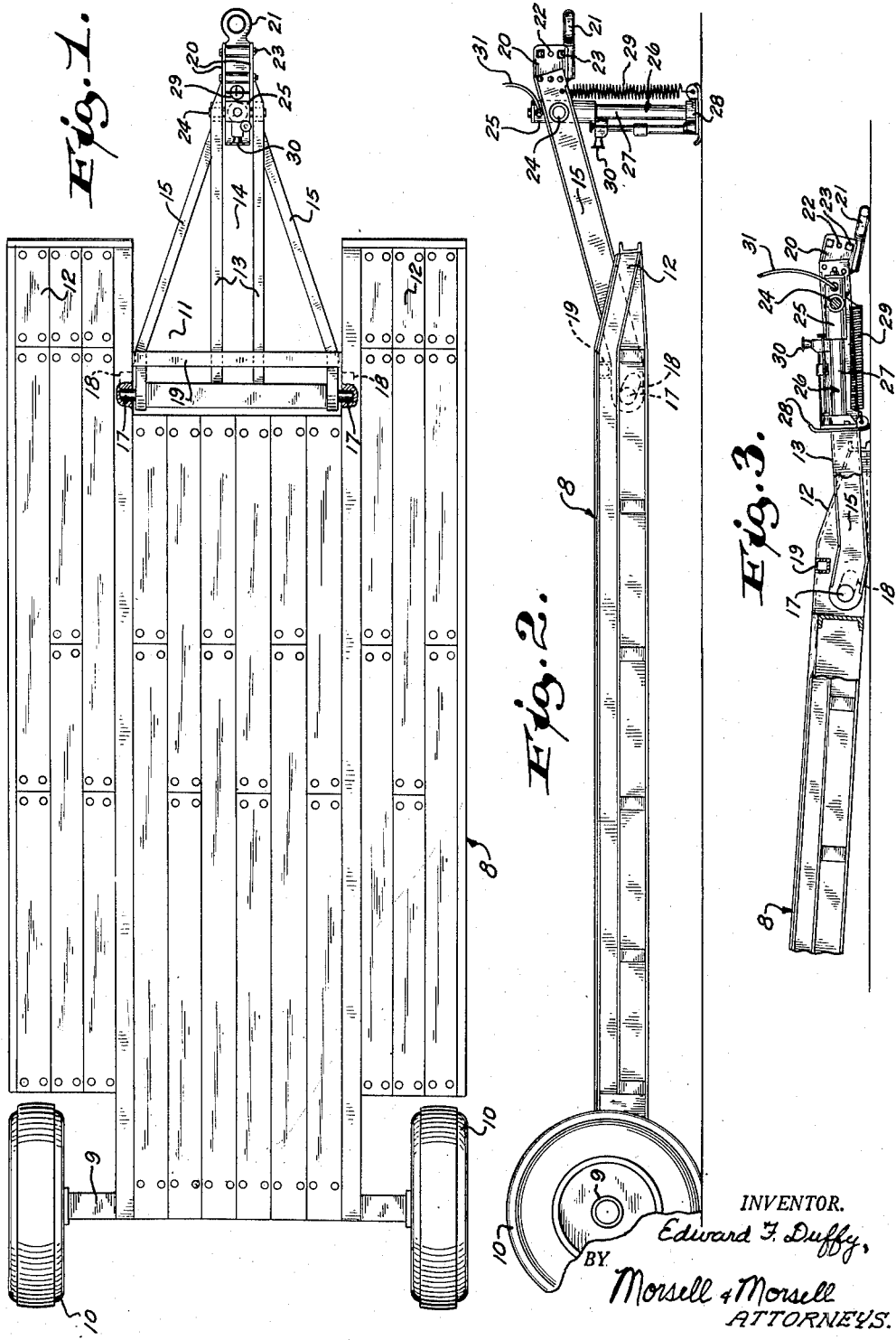
INVENTOR.
Edward F. Duffy,
BY Morsell & Morsell
ATTORNEYS.

United States Patent Office 2,784,857
Patented Mar. 12, 1957

2,784,857

HINGED DRAWBAR FOR TRAILERS

Edward F. Duffy, La Crosse, Wis., assignor to La Crosse Trailer Corporation, La Crosse, Wis., a corporation of Wisconsin Application February 28, 1955, Serial No. 490,913

4 Claims. (Cl. 214—506)

This invention relates to improvements in hinged drawbars for trailers.

Tractor-coupled low bed trailers are extensively used in connection with the hauling of crawler equipped machinery. In the conventional low bed trailer, the loading of machinery onto the trailer and unloading therefrom is accomplished from the rear end of the trailer, or side loading may be utilized but the latter requires the use of skids and necessitates the turning of the equipment after the loading operation so that the loaded machine or equipment will be disposed longitudinally on the bed of the trailer.

In many instances it may be more convenient to load the trailer from the front end thereof, after the tractor has been unhitched and removed, but trailers of the type under consideration must have drawbars which carry on their forward ends pintle rings for connection with the tractor hitch, and such drawbars are normally disposed at an elevation too high to permit practical front end loading.

With the foregoing in mind it is a primary object of the present invention to provide a hinged drawbar for trailers which, in the unhitched condition of the trailer, may be folded or hingedly moved to a position relatively close to the ground with the front end of the trailer resting on the ground to provide a front ramp, permitting very convenient front loading of the machine or equipment to be carried without interference from the drawbar.

A further object of the invention is to provide, in a low bed trailer adapted for front loading, a hinged drawbar having incorporated therewith a jack which is pivotally or hingedly associated with the front end of the drawbar so as to support and elevate the front end of the drawbar and trailer when the jack is in its normal upright position, but which can be folded into a non-interfering position within the outline of the drawbar when the latter is lowered onto the ground during loading operations.

A further object of the invention is to provide, in a front loading trailer, a hinged drawbar which also hingedly carries a jack arranged to be easily projected into a vertical operative position or folded into a non-obtrusive position in coincidence with the drawbar during loading and normal travelling positions.

A further object of the invention is to provide a hinged drawbar for trailers which is of very simple construction, which is easy to adjust and operate, which is relatively inexpensive, which is strong and durable, and which is well adapted for the purposes described.

With the above and other objects in view the invention consists of the improved hinged drawbar for trailers, and its parts and combinations as set forth in the claims, and all equivalents thereof.

In the accompanying drawing in which the same reference characters indicate the same parts in all of the views:

Fig. 1 is a plan view of a trailer provided with the improved hinged drawbar with the latter being in its elevated position for connection to a towing vehicle such as a tractor;

Fig. 2 is a side view of the showing in Fig. 1; and

Fig. 3 is a fragmentary view of the front end portion of the trailer shown in its lowered ground engaging position for loading with the drawbar and associated jack collapsed and folded against the ground to prevent interference with the machine to be loaded over the front end of the trailer, portions being broken away and in section.

Referring now more particularly to Figs. 1 and 2 of the drawing, it will be observed that the trailer illustrated is equipped with the improved hinged drawbar and is of the low bed type comprising a horizontal deck 8 carrying at its rear end a transverse axle 9 having suitable wheels 10 on the outer ends thereof. The forward end of the deck is provided intermediate its sides with a recess 11 into which the rear end portion of the drawbar structure extends. On opposite sides of the deck recess 11 are forwardly extending, downwardly angled ramps 12.

The drawbar structure includes a pair of spaced apart parallel arms 13 providing a space 14 therebetween. Welded or otherwise secured to the outer faces of the forward end portions of the arms 13 are a pair of rearwardly diverging braces 15 whose inner ends are bent parallel to the arms 13 and are joined by a transverse slat 16 to which the inner ends of the arms 13 are affixed to thereby provide a unitary drawbar structure whose widened inner end portion is received within the inner end of the deck recess 11. Stub shafts 17 project laterally from opposite sides of the widened inner end of the drawbar structure and are revolubly received within elongated openings 18 therefor in rail portions of the trailer deck there adjacent. The inner end portion of the drawbar structure also underlies a movement limiting strut 19 spanning the inner end of the deck recess 11 and secured to rail portions of the deck thereadjacent.

Secured between the forward ends of the arms 13 of the drawbar structure are a pair of forwardly projecting plates 20 which carry a pintle ring 21 whose elevation may be adjusted by means of a series of apertures 22 in the plates 20 to be selectively engaged by securing bolts 23.

Mounted between the forward ends of the drawbar arms 13, inwardly of the pintle ring carrying plates 20, is a trunnion bearing 24 forming a pivotal mounting for the cylinder portion 25 of a hydraulic jack designated generally by the numeral 26. The outer end portion of the jack piston 27 carries a ground engaging foot or support 28 to which is anchored the outer end portion of a coiled spring 29. The other end portion of the coiled spring is anchored to a fixed element or portion of the jack cylinder 25 so as to aid in the retraction of the jack piston 27 relative to the cylinder 25. The hydraulic jack is also equipped with a conventional hand actuated mechanism 30 whereby the jack may be projected to a desired length manually when the trailer is disassociated from the source of hydraulic fluid which is normally supplied to the jack cylinder through an elongated conduit 31.

When the low bed trailer is attached to the hitch (not shown) of a towing tractor or vehicle (not shown) the connection between the tractor hitch and the pintle ring 21 is such as to hold the front end portion of the trailer in an elevated position and it runs on the rear wheels 10. In the travelling position of the trailer the hydraulic jack 26 is pivotally turned on its trunnion bearing 24 to a position between the drawbar arms 13 to occupy an out of the way position in the space 14. When it is desired to load or unload a piece of machinery such as a crawler equipped apparatus relative to the trailer, the trailer is detached from the tractor or towing vehicle and the front end portion of the trailer is permitted to assume its lowered position with the ramp portions 12 thereof engaging the group and with the hinged drawbar also extending forwardly substantially parallel with the ground. The hinged drawbar assumes this position because it may pivot relative to the trailer on the stub shafts 17 which can turn and slide as required within the enlarged frame openings 18 therefor. In this loading or unloading position of the trailer, illustrated in Fig. 3, the jack structure is also in its out of the way non-interfering position between the arms 13 of the drawbar within the space 14. As so arranged the piece of heavy machinery may be run onto the trailer from the front end, moving over the inclined ramp portions 12 and clearing the lowered drawbar and the jack structure confined therewithin. Unloading of a piece of machinery from the bed of the trailer is accomplished in the same simple manner and the use of side loading ramps and the necessity of swinging or repositioning the carried machinery is eliminated.

After a piece of heavy machinery has been loaded onto the bed portion of the trailer by running up the ground engaging ramps 12 when the assemblage is in the position of Fig. 3, the front end portion of the trailer may be easily elevated and thereafter engaged with the hitched portion of the tractor or pulling vehicle. This is accomplished by swinging the jack from the folded position of Fig. 3 into a vertical ground engaging position and manually operating the mechanical portion 30 of the jack until the piston 27 of the jack is sufficiently extended. At such time as the hydraulic system conduit 31 may be connected with the source of hydraulic fluid the jack may thereafter be operated hydraulically until the proper elevation is attained and the pintle ring 21 is engaged wtih the tractor hitch. Thereafter the piston 27 is retracted relative to its cylinder 25 and the spring 29 aids in holding the piston in its retracted position. The jack structure is also turned on its trunnion bearing so as to lie in the space 14 between the drawbar arms 13 which position is maintained when the trailer is being transported.

The improved hinged drawbar for trailers, besides permitting a varied or adjustable height for the pintle ring 21, provides an associated jack for raising and lowering the ramp-equipped front loading end of a low bed trailer. When the front ramp-equipped end of the trailer is in its ground engaging position for machinery loading and unloading the hinged drawbar and the hingedly carried jack easily assume the folded relationship against the ground or supporting surface and do not interfere with the movement of machinery along the ramps at the front end of the trailer.

The hinged drawbar and foldably associated jack structure permits desirable front end loading and unloading of a trailer and the mechanism is simple, easily operated and is well adapted for the purposes described.

What is claimed as the invention is:

1. In a trailer transportably supported at its rear end on wheels and having a front end susceptible of being raised and lowered relative to the ground, integral ramps projecting forwardly from opposite side portions of the front end, a rigid drawbar extending between said ramps and pivotally connected to the front end portion of the trailer, the drawbar being formed with a recessed portion, and a jack pivotally carried only by the drawbar and swingable from an inoperative position within said drawbar recess substantially alined with the trailer and drawbar to an operative position transverse to the drawbar.

2. In a trailer having a machinery carrying flat bed transportably supported at its rear end on wheels and with the front end portion of the bed being susceptible of being raised and lowered relative to the ground for front end loading, a rigid drawbar pivotally connected to the front end portion of the bed, the drawbar being formed with a longitudinal recess, an hydraulic jack pivotally carried directly by the drawbar and swingable from an inoperative position within said drawbar recess and parallel to the drawbar to an operative position transverse to the drawbar for raising and lowering the drawbar and front end portion of the trailer bed, and a coupling member carried by the free end of the drawbar.

3. The combination with a trailer having a bed supported by wheels at its rear end with the front end of the bed being susceptible of being raised and lowered relative to the ground, spaced-apart ramps carried by the front end of the bed and providing a space therebetween, a slotted, rigid drawbar extending into said space and pivotally connected at its inner end to a portion of the bed to move in a vertical plane, a coupling member vertically adjustably carried by the outer end of the drawbar, and a jack pivotally carried by the drawbar and swingable from a downwardly projecting operative position to a collapsed position within the slotted portion of the drawbar and parallel thereto whereby a vehicular machine loaded onto the front end of the trailer bed by moving over said ramps will clear the drawbar and folded jack.

4. The combination with a trailer having a bed supported by wheels at its rear end with the front end of the bed being susceptible of being raised and lowered relative to the ground, a slotted, rigid drawbar connected at its inner end to a portion of the bed to move in a vertical plane, and a jack pivotally carried by the drawbar and swingable from a downwardly projecting operative position to a a collapsed position within the slotted portion of the drawbar and parallel thereto.

References Cited in the file of this patent

UNITED STATES PATENTS

| 2,431,436 | Townsend | Nov. 25, 1947 |
| 2,590,210 | Rogers | Mar. 25, 1952 |
| 2,591,226 | Askue | Apr. 1, 1952 |
| 2,605,916 | Martin | Aug. 5, 1952 |
| 2,627,424 | Chapin | Feb. 3, 1953 |
| 2,628,126 | Black | Feb. 10, 1953 |

FOREIGN PATENTS

| 1,062,775 | France | Dec. 9, 1953 |